US008824665B2

(12) United States Patent
Dove

(10) Patent No.: US 8,824,665 B2
(45) Date of Patent: Sep. 2, 2014

(54) UNSHIELDED TWISTED PAIR TERMINATION CIRCUIT

(75) Inventor: Daniel J. Dove, Colfax, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 702 days.

(21) Appl. No.: 12/901,736

(22) Filed: Oct. 11, 2010

(65) Prior Publication Data

US 2012/0086525 A1 Apr. 12, 2012

(51) Int. Cl.
*H04M 7/04* (2006.01)
(52) U.S. Cl.
USPC ...................................... 379/398; 379/387.01
(58) Field of Classification Search
USPC ............................................ 379/398–413.04
See application file for complete search history.

(56) References Cited

U.S. PATENT DOCUMENTS

| 6,184,919 B1 * | 2/2001 | Asprey et al. ............... 725/148 |
| 7,575,478 B1 * | 8/2009 | Wei .......................... 439/620.11 |
| 2002/0180592 A1 * | 12/2002 | Gromov .................. 340/310.01 |
| 2011/0243254 A1 * | 10/2011 | Pischl ......................... 375/257 |

FOREIGN PATENT DOCUMENTS

JP 2008301287 A * 12/2008 ............. H03M 1/08

* cited by examiner

*Primary Examiner* — Duc Nguyen
*Assistant Examiner* — Assad Mohammed

(57) ABSTRACT

Unshielded twisted pair (UTP) termination circuits, UTP termination circuit systems, and methods of terminating an UTP circuit are provided. UTP termination circuits can include a plurality of resistors in parallel, where each of the plurality of resistors is configured to be coupled to one of a plurality of unshielded twisted pairs of an UTP cable, a shunt resistor is coupled in series with the plurality of parallel resistors, and a capacitor is connected to ground in series with the shunt resistor.

13 Claims, 3 Drawing Sheets

UNSHIELDED TWISTED PAIR TERMINATION CIRCUIT

BACKGROUND

Network devices may be networked to share data, information, and/or software programs; share physical resources such as printers, modems, hard disk drives; and backup or save data for storage. Computing networks can include multiple network devices such as routers, switches, hubs, servers, desktop PCs, laptops, workstations, and peripheral devices, e.g., printers, facsimile devices, and scanners, networked together.

Networks, including local area networks (LANs), may use unshielded twisted pair (UTP) cables as transmission lines for high bandwidth communication of data and/or energy transmission between network devices. For example, the UTP cables may have four twisted pairs, each pair including two conductors, e.g. wires.

When data and/or energy is transmitted over a UTP cable using a high bandwidth, interference from high frequency energy sources may be induced into the cable when an impedance mismatch between the wires and a local ground may cause a portion of the interference energy to reflect back from a port. This reflection of energy may result in a standing wave over the UTP cable which amplifies its effect upon the data transmission and reception.

DETAILED DESCRIPTION

Figure 1:
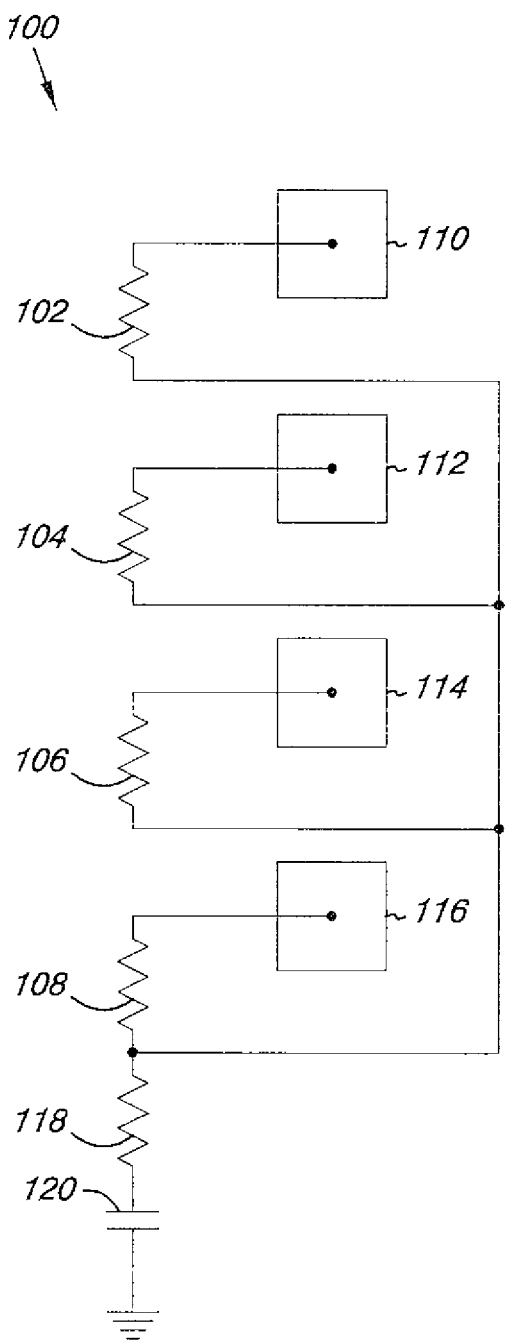
FIG. 1 is a schematic illustrating an example of an unshielded twisted pair (UTP) termination circuit according to the present disclosure.

Examples of the present disclosure may include UTP termination circuits, UTP termination circuit systems, and methods of terminating an UTP circuit. The UTP termination circuits, UTP termination circuit systems, and the methods of terminating an UTP circuit as disclosed herein are useful in computing networks.

Computing networks, e.g. Ethernet networks, can include multiple network devices such as routers, switches, hubs, servers, desktop personal computers, laptops, workstations, and peripheral devices, e.g., printers, facsimile devices, and scanners that are networked together. Such network devices can include a processor in communication with a memory and may include network chips having hardware logic, e.g., in the form of application specific integrated circuits (ASICs), associated with a number of network ports. The term "network" as used herein is not limited to a number, type, and/or configuration of the network devices.

The network devices may include a media access controller and a physical interface transceiver. Media access controllers may be defined by the IEEE-802.3 Ethernet standard and can be configured in the network devices as data link layers. Physical interface transceivers may connect corresponding media access controllers to a physical medium, such as a twisted pair wire, and can be configured to exchange data between the media access controller and the physical medium. In a receive mode, the physical interface transceiver can receive data from the physical medium and decode the data into a form appropriate for the receiving network device. In a transmit mode, the physical interface transceiver can take data from the network device, typically from the media access controller, and convert the data into a form appropriate for the physical medium. In this manner network devices may send and receive data from one another. Ethernet networks may utilize unshielded twisted pair (UTP) cables to send and receive the data. UTP cables can be used with Ethernet physical layers: 10BASE-T, 100BASE-TX, 100BASE-T2, 100BASE-T4, 1000BASE-T and 10GBASE-T.

UTP cable is a medium that includes pairs of conductors, e.g. copper wires. In some examples, the wires can have a diameter of 0.4 to 0.8 millimeters (mm). A UTP cable may include eight wires, where each of the wires is covered in an insulator. Each of the eight covered wires may be twisted around another to form four twisted pairs. Each of the four twisted pairs may have a different twist rate; i.e. a different number of twists per meter. The four twisted pairs are twisted together and encased in a flexible tube, e.g. a jacket, to provide the UTP cable. Twisting of the wires can increase noise immunity and help reduce the bit error rate (BER) associated with data transmission over the UTP cable. Also, using two wires rather than one to carry each signal permits differential signaling to be used; which offers enhanced immunity to the effects of external electrical noise.

UTP cables may include a Registered Jack 45 (RJ-45) connector. The RJ-45 connector may also be referred to as an 8-pin Modular Connector. The RJ-45 connector is an eight-wire connector. RJ-45 connectors are described, for example; the in TIA/EIA-568-B.2-1 industry standard document that was approved on Jun. 20, 2002 by the Telecommunications Industry Association. RJ-45 connectors are the types of connectors that may be used to connect computers and/or other network devices to computing networks and/or to Internet connections. The RJ-45 connector may be utilized with 10BASE-T, 100BASE-TX, 100BASE-T2, 100BASE-T4, 1000BASE-T and 10GBASE-T physical layer types.

Additionally, with the continued evolution of data communication applications, performance standards and requirements for components of the computing networks continue to advance. For example, UTP cable providers must meet certain data communication capabilities and limitations, such as those provided by the International Electrotechnical Commission (IEC). UTP cables can be categorized into a number of categories, which define impedance of the UTP cable as well as electrical characteristics supporting transmission at particular bandwidths. The categories are defined by the TIA/EIA 568-A specification, which indicates if the UTP cable supports particular Ethernet physical layers.

An IEC test (IEC 61000-4-6) for conducted interference applies a voltage to a UTP cable based upon calibrated voltages applied to a properly terminated test cable. When a termination for the UTP cable does not match the impedance of the cable, the applied voltage may be reflected, which at some frequencies, may result in a standing wave. The UTP termination circuits, UTP termination circuit systems, and the methods of terminating an UTP circuit, as disclosed herein, are useful to help minimize reflections and thus provide better results in the IEC test for conducted interference. The reflections can be minimized when a total resistance of the UTP termination circuit approaches, e.g. matches, an impedance of the UTP cable.

Previous solutions have used 75 ohm termination resistances to earth to provide a common-mode match. These 75 ohm termination resistances can be useful for a given unshielded twisted pair. However, when multiple, e.g. four, unshielded twisted pairs are employed the common-mode impedance is divided and can result in an impedance that is too low. For example, when IEC 61000-4-6 is performed energy can transmit down the UPT cable and hit the too low impedance, which can have a value of approximately 19 ohms when there are four unshielded twisted pairs. Because the UPT cable and the termination are at different impedances, the energy can be reflected.

In the detailed description of the present disclosure, reference is made to the accompanying drawings that form a part hereof, and in which is shown by way of illustration how examples of the disclosure may be practiced. These examples are described in sufficient detail to provide enablement and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Examples of the present disclosure provide a UTP termination circuit. FIG. 1 is a schematic illustrating of a UTP termination circuit 100 according to an example of the present disclosure.

UTP termination circuit 100 includes a plurality of resistors 102, 104, 106, 108. As illustrated in FIG. 1, the plurality of resistors 102, 104, 106, 108 are connected in parallel. The resistors are two-terminal electronic components that produce a voltage across the terminals, where the voltage is proportional to the electric current passing through the resistor. According to some examples of the present disclosure, each of the plurality of resistors 102, 104, 106, 108 can include various elements, compounds, films, and/or resistance wire.

UTP termination circuit 100 includes a plurality of connections 110, 112, 114, 116. The connections 110, 112, 114, 116 connect each of the plurality of resistors 102, 104, 106, 108 to one of a plurality of twisted pairs of a twisted pair cable. For example, each of the connections 110, 112, 114, 116 may be a transformer. The transformers may include a center tap. According to some examples of the present disclosure, the transformer may be a magnetic transformer. According to some examples of the present disclosure, the transformer may be a non-magnetic transformer. Each of the connections 110, 112, 114, 116 may be another type of connection.

According to some examples of the present disclosure, each of the connections 110, 112, 114, 116 may include a choke. The choke may be an inductor that blocks, e.g. has a higher resistance to, higher frequencies in an electrical circuit while passing, e.g. has a lower resistance to, signals of much lower frequency and/or direct current. According to some examples of the present disclosure, the choke is a common-mode choke. The common mode choke may help reduce electromagnetic interference (EMI) and/or radio frequency interference, while blocking common-mode currents and passing differential currents (equal but opposite).

According to some examples of the present disclosure, each of the plurality of resistors 102, 104, 106, 108 may have an equal resistance. For example, each of the plurality of resistors 102, 104, 106, 108 may have a resistance value that is one half of an impedance between one of the plurality of twisted pairs of the twisted pair cable that the plurality of resistors is configured to be coupled to. For example, one of the plurality of twisted pairs of the twisted pair cable that the plurality of parallel resistors is configured to be coupled to may have an impedance of 75 ohms, which case each of the plurality of resistors 102; 104, 106, 108 would have a resistance value of 37.5 ohms. Other values of the resistance include, but are not limited to 30.1 ohms, 30.9 ohms, 31.6 ohms, 32.4 ohms, 33.2 ohms, 34.0 ohms, 34.8 ohms, 36.5 ohms, 37.4 ohms, 38.3, 39.2 ohms, and 40.2 ohms.

According to some examples of the present disclosure, one or more of the plurality of resistors 102, 104, 106, 108 may have a different resistance than another of the plurality of resistors 102, 104, 106, 108. For example, each of the plurality of resistors may have a resistance that is one half of an impedance between the one of the plurality of twisted pairs of the twisted pair cable that the resistor is configured to be coupled to. In such cases, an impedance between each of the plurality of twisted pairs may have a different value. As such, half of each of the different impedance values will result in a different resistance value for each of plurality of resistors 102, 104, 106, 108. The different resistance values can have a value, such as 37.5 ohms and 32.4 ohms, as discussed herein.

Impedance can be considered a measure of the total opposition a circuit offers to the flow of direct or alternating current. Impedance can include effects of resistance, inductance, and capacitance. These effects may all contribute to impeding the flow of direct or alternating current.

UTP termination circuit 100 includes a shunt resistor 118. As illustrated in FIG. 1, the shunt resistor 118 is in series with the plurality of resistors 102, 104, 106, 108. The shunt resistor 118 may have a resistance such that a sum of the parallel resistances of the plurality of resistors 102, 104, 106, 108 and the resistance of the shunt resistor 118 is equal to an impedance of the twisted pair cable relative to earth ground. For such an example, a total resistance of the UTP termination circuit 100 approaches, e.g. matches, an impedance of the UTP cable that the plurality of resistors 102, 104, 106, 108 are configured to be coupled to. Matching the total resistance to the impedance of the UTP cable can reduce resonant effects and improve regulatory compliance performance for conducted interference, as discussed herein.

Values of the shunt resistor 118 resistance include, but are not limited to, 60.4 ohms, 61.9 ohms, 63.4 ohms, 64.9 ohms, 65.5 ohms, 68.1 ohms, and 69.8 ohms. The shunt resistor 118 is a two-terminal electronic component that produces a voltage across the terminals, where the voltage is proportional to the electric current passing through the shunt resistor 118. According to some examples of the present disclosure, the shunt resistor 118 can include various elements, compounds, films, and/or resistance wire.

UTP termination circuit 100 includes a capacitor 120 to ground. As illustrated in FIG. 1, the capacitor 120 to ground is in series with the shunt resistor 118. According to some examples of the present disclosure, the capacitor 120 to ground is a passive electronic component including of a pair of conductors separated by a separated by a non-conductive region. The non-conductive region may include a dielectric, e.g. an insulator, a vacuum, or a semiconductor depletion region.

The capacitor 120 to ground may be an alternating current coupling capacitor. The capacitor 120 to ground blocks direct current while allowing alternating current to pass. The capacitor 120 to ground may have different capacitances for different applications. According to some examples of the present disclosure, the capacitor 120 to ground has a capacitance of 0.1 microfarads (μF).

The shunt resistor 118 can shunt common-mode signals and noise to ground through the capacitor 120 to ground. "Noise" used herein refers to any undesired signal component that is present in the circuit, or on power and ground planes. Such noise has the potential to cause electromagnetic interference (EMI). Sources of noise can include: digital signals, clock signals and their harmonics; signal overshoots, spikes, ringing and distortion; rapidly rising and falling voltage transitions (dv/dt); rapid current changes (di/dt); switching power supply ripple voltage and switching spikes, etc.

Figure 2:
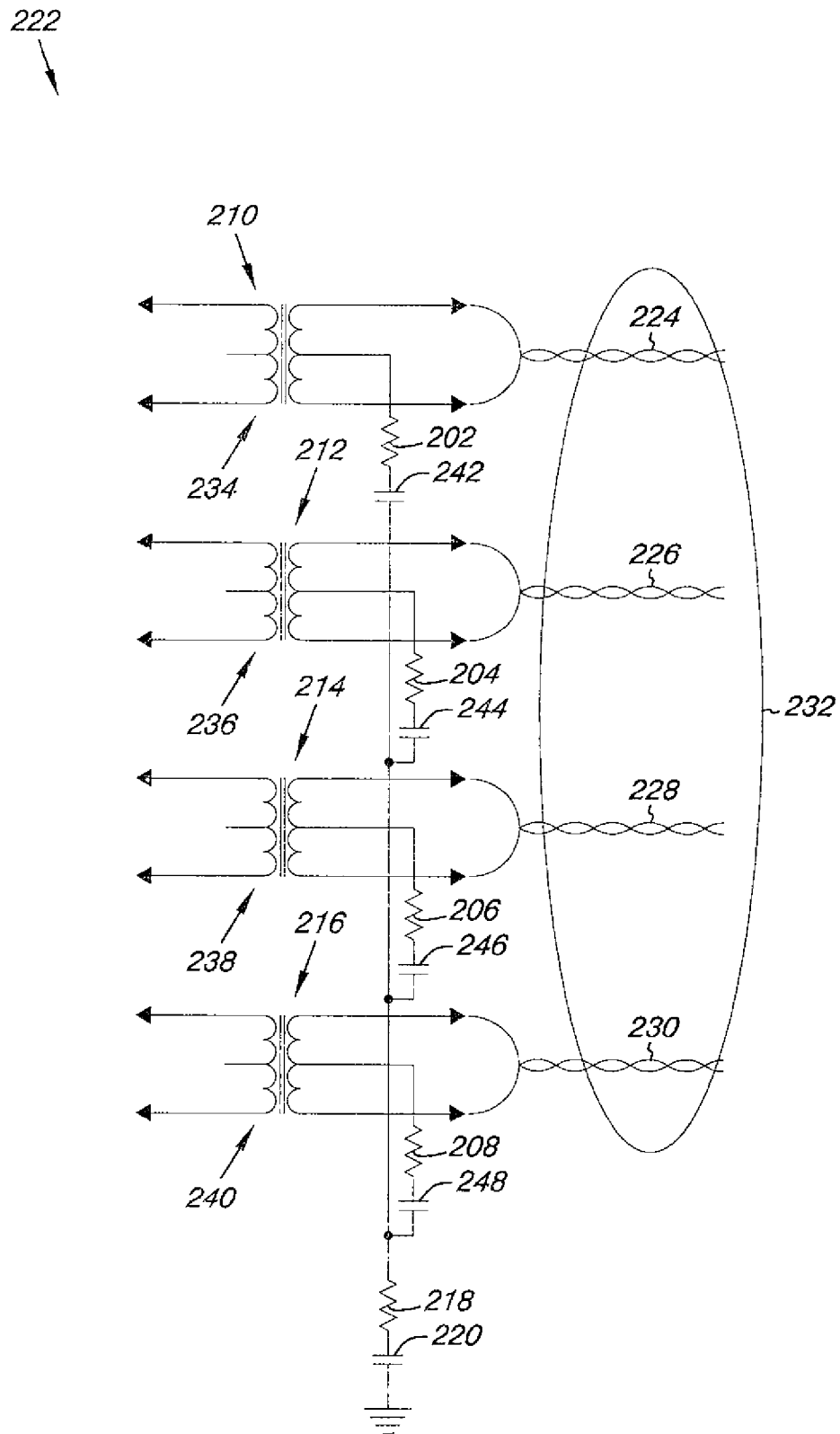
FIG. 2 is a schematic illustrating an example of an UTP pair termination circuit system according to the present disclosure.

Examples of the present disclosure may include a UTP termination circuit system. FIG. 2 is a schematic illustrating UTP termination circuit system 222 according to an example of the present disclosure. UTP termination circuit system 222 includes a plurality of twisted pairs 224, 226, 228, 230 of twisted pair cable 232. The twisted pair cable 232 may be a UTP cable.

As illustrated in FIG. 2, each plurality of the twisted pairs 224, 226, 228, 230 are terminated by the plurality of connections 210, 212, 214, 216. As discussed each of the connections 210, 212, 214, 216 may be a transformer and may include a center tap 234, 236, 238, 240.

UTP termination circuit system 222 includes the plurality of resistors 202, 204, 206, 208, as discussed regarding FIG. 1. As illustrated in FIG. 2, the plurality of resistors 202, 204, 206, 208 are connected in parallel. Each of the plurality of resistors 202, 204, 206, 208 is coupled to one of the plurality of twisted pairs 224, 226, 228, 230 of the twisted pair cable 232 at the center tap 234, 236, 238, 240 of transformer 210, 212, 214, 216. UTP termination circuit system 222 includes the shunt resistor 218. As illustrated in FIG. 2, the shunt resistor 218 is in series with the plurality of resistors 202, 204, 206, 208. UTP termination circuit system 222 further includes the capacitor 220 to ground. As illustrated in FIG. 2, the capacitor 220 to ground is in series with the shunt resistor 218.

According to some examples of the present disclosure, the UTP termination circuit system 222 may include a plurality of blocking capacitors 242, 244, 246, 248. As illustrated in FIG. 2, each of the plurality of blocking capacitors 242, 244, 246, 248 is in series with one of the plurality of resistors 202, 204, 206, 208. According to some examples of the present disclosure, each of the plurality of blocking capacitors 242, 244, 246, 248 is a passive electronic component including of a pair of conductors separated by a separated by a non-conductive region. The non-conductive region may include a dielectric, e.g. an insulator, a vacuum, or a semiconductor depletion region.

Each of the plurality of blocking capacitors 242, 244, 246, 248 may be an alternating current coupling capacitor. Each of the plurality of blocking capacitors 242, 244, 246, 248 blocks direct current while allowing alternating current to pass. Each of the plurality of blocking capacitors 242, 244, 246, 248 may have the same capacitance or different capacitances. Some of the plurality of blocking capacitors 242, 244, 246, 248 may have the same capacitance while some other of the plurality of blocking capacitors 242, 244, 246, 248 different capacitances. According to some examples of the present disclosure, the blocking capacitors 242, 244, 246, 248 each have a capacitance of 0.1 μF.

According to some examples of the present disclosure, the UTP termination circuits, UTP termination circuit systems, and the methods of providing a UTP termination circuit may be employed in a Power over LAN™, also referred to as a Power over Ethernet scheme. Such a scheme enables direct current power to be supplied to Ethernet data terminals over local area network (LAN) cabling, such as twisted pair cable 232. This technology enables the terminals, termed powered devices, to receive their operating power over the same Ethernet LAN connection that they use for data communication. It thus eliminates the need to connect each terminal to an alternating current power socket, and the need to provide each terminal with its own alternating current/direct current power converter. The technology also enables powered devices to be recognized as such by a "signature" generated by the terminal.

Power over Ethernet is defined in the IEEE (The Institute of Electrical and Electronics Engineers, Inc.) Standard Std 802.3af-2003 published Jun. 18, 2003 and entitled "IEEE Standard for Information technology-Telecommunications and information exchange between systems-Local and metropolitan area networks-Specific requirements: Part 3 Carrier Sense Multiple Access with Collision Detection (CSMA/CD) Access Method and Physical Layer Specifications: Amendment: Data Terminal Equipment (DTE) Power via Media Dependent Interface (MDI)", which may be more simply referred to as IEEE 802.3af standard. The IEEE 820.3af standard is a globally applicable standard for combining the transmission of Ethernet packets with the transmission of direct current-based power over the same set of wires in a single Ethernet cable. The power is direct current, 48 Volt power available at a range of power levels from roughly 0.5 watts to about 15.4 watts in accordance with the IEEE 820.3af standard.

A Power over Ethernet scheme may include an Ethernet switch and a power hub, which serves as a direct current power source, along with a number of powered device terminals, which communicate via the switch and draw power from the hub. The Power over Ethernet scheme may be connected in a star topology, with each terminal linked by a cable, e.g. twisted pair cable 232, to the switch and hub. The power hub in one chassis may be integrated with the switch in a second chassis, in a console containing both chassis, in what is known as an "end-span" configuration. Direct current power is carried to the loads (i.e., the terminals) over twisted pairs 224, 226, 228, 230 of twisted pair cable 232. Blocking capacitors 242, 244, 246, 248 block direct current from flowing through the termination circuit.

Figure 3:
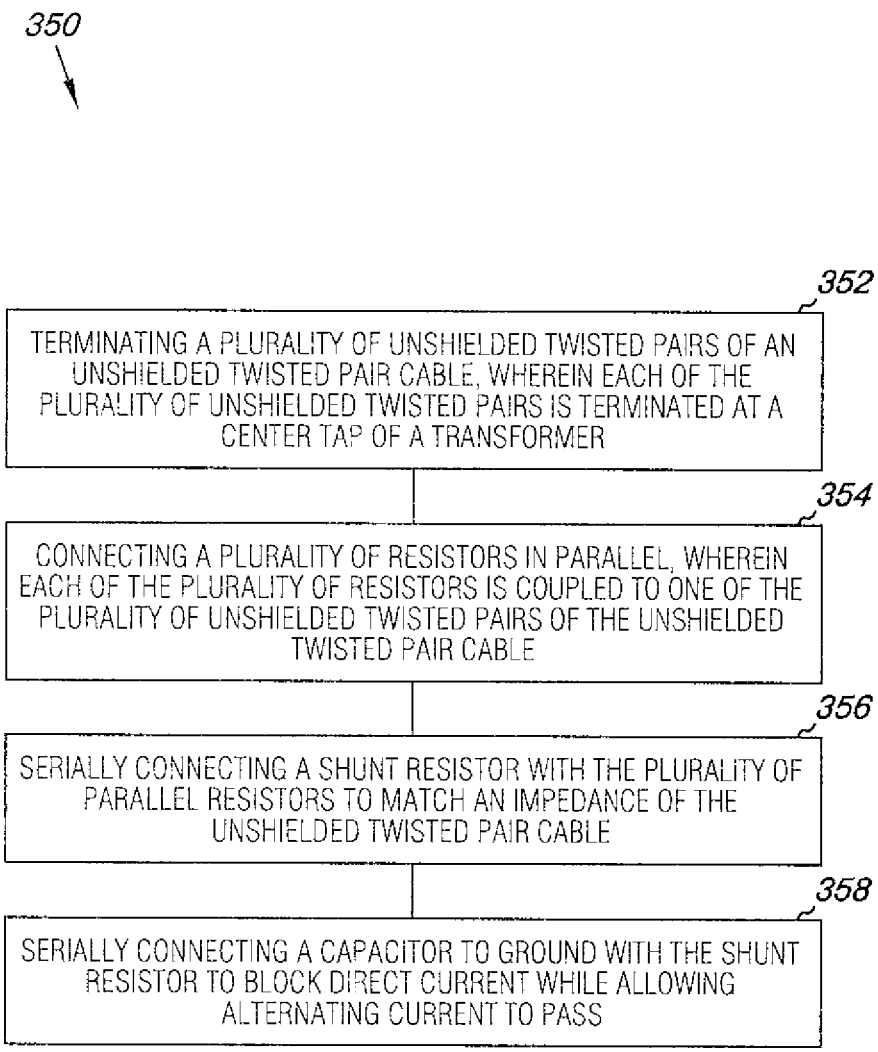
FIG. 3 is a flow chart illustrating an example of a method for terminating an UTP circuit according to the present disclosure.

FIG. 3 is a flow chart illustrating an example of a method 350 for terminating a UTP circuit according to the present disclosure. As shown in block 352, the method includes terminating a plurality of unshielded twisted pairs of an unshielded twisted pair cable, where each of the plurality of unshielded twisted pairs is terminated at a transformer. Terminating the plurality of unshielded twisted pairs of the unshielded twisted pair cable includes determining the impedance of the unshielded twisted pair cable.

As shown in block 354, the method includes connecting a plurality of resistors in parallel, where each of the plurality of resistors is coupled to one of the plurality of unshielded twisted pairs of the unshielded twisted pair cable. According to some examples of the present disclosure, connecting the plurality of resistors in parallel can include determining an impedance for each of the plurality of twisted pairs of the unshielded twisted pair cable to select a resistance for one or more of the plurality of resistors. According to some examples of the present disclosure, determining the impedance for each of the plurality of twisted pairs of the unshielded twisted pair cable includes choosing for each of the plurality of resistors a resistance that is one half of the impedance between the one of the plurality of twisted pairs of the unshielded twisted pair cable that the resistor is coupled to.

As shown in block 356, the method includes serially connecting a shunt resistor with the plurality of resistors to match an impedance of the unshielded twisted pair cable. According to some examples of the present disclosure, serially connecting the shunt resistor with the plurality of parallel resistors to match an impedance of the unshielded twisted pair cable can include choosing a resistance for the shunt resistor such that a sum of the resistances of the plurality of resistors and the resistance of the shunt resistor is equal to the impedance of the unshielded twisted pair cable.

As shown in block 358, the method includes serially connecting a capacitor to ground in series with the shunt resistor to block direct current while allowing alternating current to pass. According to some examples of the present disclosure, the method can further include connecting a plurality of blocking capacitors to block direct current from flowing through the unshielded twisted pair circuit. Each of the plurality of blocking capacitors can be connected in series with one of the plurality of resistors.

In this manner, the one or more method examples described above may provide a more accurate common-mode match, thus eliminating reflected energy and resolving potential amplification that can occur in a UTP cable.

In the above description, numerous specific details are given to provide a thorough understanding of examples of the present disclosure. However, the above description of illustrated examples of the present disclosure is not intended to be exhaustive or to limit the present disclosure to the precise forms discussed. Examples of the present disclosure can be practiced without one or more of the specific details, or with other methods, components, etc. In other instances, well-known structures or operations are not shown or described in detail to avoid obscuring aspects of examples of the present disclosure. While specific examples of, and examples for, the present disclosure are described herein for illustrative purposes, various equivalent modifications are possible within the scope of the present disclosure.

These modifications can be made to the examples of the present disclosure in light of the above detailed description. The terms used in the following claims should not be construed to limit the present disclosure to the specific examples disclosed in the specification and the claims. Rather, the scope of the present disclosure is to be determined by the following claims, which are to be construed in accordance with established doctrines of claim interpretation.

What is claimed:

1. An unshielded twisted pair termination circuit comprising:
    a plurality of resistors in parallel with each other, wherein each of the plurality of resistors is to be coupled to one of a plurality of twisted pairs of a twisted pair cable;
    a shunt resistor in series with the plurality of parallel resistors to reduce resonant effects, wherein the shunt resistor has a resistance such that a sum of the parallel resistances of the plurality of resistors and the resistance of the shunt resistor is equal to an expected impedance of the twisted pair cable relative to earth ground; and
    a capacitor to ground in series with the shunt resistor.
2. The unshielded twisted pair termination circuit of claim 1, wherein each of the plurality of resistors has an equal resistance.
3. The unshielded twisted pair termination circuit of claim 2, wherein the equal resistance of each of the plurality of resistors has a value that is one half of an impedance of one of the plurality of twisted pairs of the twisted pair cable to which the plurality of resistors is to be coupled.
4. The unshielded twisted pair termination circuit of claim 1, further comprising a plurality of blocking capacitors to block direct current from flowing through the unshielded twisted pair termination circuit, wherein each of the plurality of blocking capacitors is in series with one of the plurality of resistors.
5. An unshielded twisted pair termination circuit system comprising:
    a plurality of twisted pairs of a twisted pair cable, wherein each of the plurality of twisted pairs is terminated at a transformer;
    a plurality of resistors in parallel with each other, wherein each of the plurality of resistors is coupled to one of the plurality of twisted pairs of the twisted pair cable at a center tap of the transformer;
    a shunt resistor in series with the plurality of resistors to reduce resonant effects, wherein the shunt resistor has a resistance such that a sum of parallel resistances of the plurality of resistors and the resistance of the shunt resistor is equal to an expected impedance of the twisted pair cable; and
    a capacitor to ground in series with the shunt resistor.
6. The unshielded twisted pair termination circuit system of claim 5, wherein each of the plurality of resistors has a resistance that is one half of an impedance between the one of the plurality of twisted pairs of the twisted pair cable that the resistor is coupled to.
7. The unshielded twisted pair termination circuit system of claim 5, further comprising a plurality of blocking capacitors to block direct current from flowing through the unshielded twisted pair circuit system, wherein each of the plurality of blocking capacitors is in series with one of the plurality of resistors.
8. The unshielded twisted pair termination circuit system of claim 5, wherein the twisted pair cable is an unshielded twisted pair cable that includes a RJ-45 connector.
9. A method of terminating an unshielded twisted pair circuit comprising:
    terminating a plurality of unshielded twisted pairs of an unshielded twisted pair cable, wherein each of the plurality of unshielded twisted pairs is terminated at a transformer;
    connecting a plurality of resistors in parallel, wherein each of the plurality of resistors is coupled to one of the plurality of unshielded twisted pairs of the unshielded twisted pair cable at a center tap of a corresponding transformer;
    serially connecting a shunt resistor with the plurality of parallel resistors to match an impedance of the unshielded twisted pair cable, including choosing a resistance for the shunt resistor such that a sum of the resistances of the plurality of resistors and the resistance of the shunt resistor is equal to an expected impedance of the unshielded twisted pair cable; and
    serially connecting a capacitor to ground in series with the shunt resistor to block direct current while allowing alternating current to pass.
10. The method of claim 9, wherein connecting the plurality of resistors in parallel includes determining an impedance for each of the plurality of twisted pairs of the unshielded twisted pair cable to select a resistance for one or more of the plurality of resistors.

11. The method of claim 10, wherein determining the impedance for each of the plurality of twisted pairs of the unshielded twisted pair cable includes choosing for each of the plurality of resistors a resistance that is one half of the impedance of the one of the plurality of twisted pairs of the unshielded twisted pair cable that to which the resistor is coupled.

12. The method of claim 9, further comprising determining the impedance of the unshielded twisted pair cable to match the impedance of the unshielded twisted pair cable.

13. The method of claim 9, further comprising:
connecting a plurality of blocking capacitors to block direct current from flowing through the unshielded twisted pair circuit, wherein each of the plurality of blocking capacitors is in series with one of the plurality of resistors.

* * * * *